United States Patent [19]

Caldon et al.

[11] 3,883,345

[45] May 13, 1975

[54] PROCESS FOR THE RECOVERY OF ANTIMONY

[75] Inventors: Frank R. Caldon; Joseph E. Pimentel, both of Arvada; Clifford J. Lewis, Lakewood, all of Colo.

[73] Assignee: National Lead Company, New York, N.Y.

[22] Filed: Aug. 10, 1971

[21] Appl. No.: 170,434

[52] U.S. Cl. ............................ 75/1; 75/69; 75/108; 423/87
[51] Int. Cl. ...................... C22b 31/00; C01g 57/00
[58] Field of Search............... 75/108, 1, 69, 101 R; 23/144

[56] References Cited
UNITED STATES PATENTS

| | | | |
|---|---|---|---|
| 1,284,910 | 11/1918 | Larson | 75/108 X |
| 1,679,337 | 7/1928 | Moulden et al. | 75/72 |
| 1,778,020 | 10/1930 | Blaylock et al. | 75/69 |
| 2,325,176 | 7/1943 | Deitz | 75/69 X |
| 2,331,395 | 10/1943 | Holmes | 75/101 R X |
| 3,141,765 | 7/1964 | Brown et al. | 75/108 X |
| 3,476,553 | 11/1969 | Sebba et al. | 75/108 |
| 3,656,936 | 4/1972 | Haas | 75/101 R |

*Primary Examiner*—Allen B. Curtis

[57] ABSTRACT

A process for the recovery of antimony values from a material containing the same is described wherein the material is subjected to a controlled roasting step, the resulting calcine leached with an alkaline solution to extract antimony values and the antimony-pregnant solution acidified to precipitate antimony values.

The roasting step is carried out in a reducing environment thus assuring that the calcine contains only trivalent antimony and broadening the operable feed to the process. The acidification step is preferably one which regenerates the leaching solution for recycle to the process.

40 Claims, 2 Drawing Figures

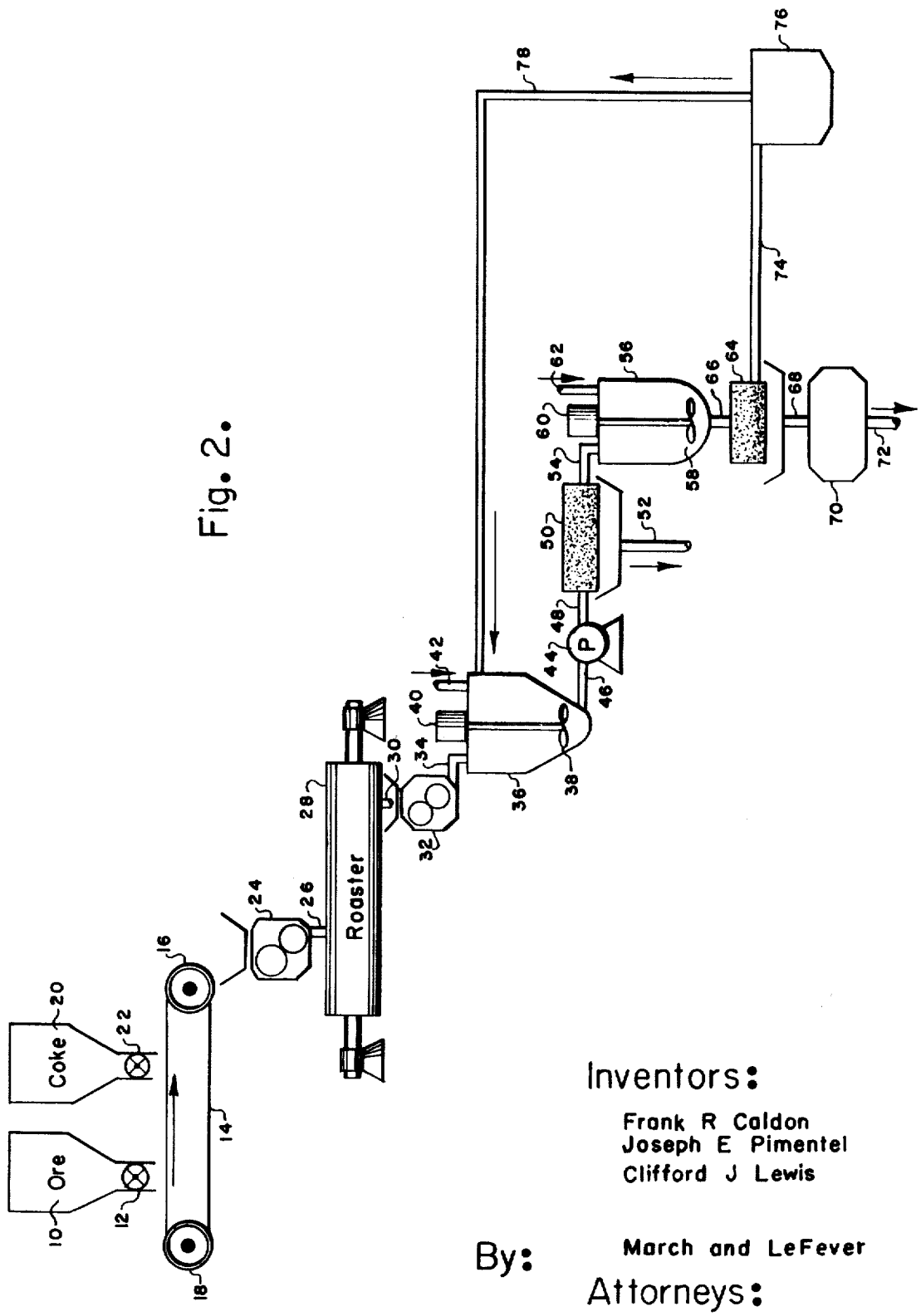

PROCESS FOR THE RECOVERY OF ANTIMONY

BACKGROUND OF INVENTION

This invention relates to a new process for obtaining high purity antimony concentrate from ores and minerals which contain antimony. The invention is most timely since (a) antimony and antimony salts are valuable and vital items of the Free World economy and the principal source of antimony has long been and presently is from countries now dominated by the governments hostile to the Free World; (b) this invention makes it economically practical to recover antimony from ore deposits hitherto marginal or uneconomic; and (c) the process of the invention eliminates, or at least greatly minimizes, depending upon the composition of the antimony minerals in a given ore body, the air pollution normally associated with the emission of sulfur dioxide and other noxious gases during the processing of antimony sulfide minerals.

Furthermore, the inventive process produces a high purity antimony salt or, through slight further refinement, antimony metal, without the use of electrodeposition of antimony and thus reduces the demand for electrical power in areas where it is in short supply or not available. In areas where electrical power is readily available, metal could be obtained by electrowinning.

The process of the invention permits the recovery of antimony from a mixture of antimony oxides and antimony sulfides, thereby eliminating waste of the antimony oxide minerals as tailings which is the present common practice.

The recovery of antimony metal and antimony salts from ore and mineral sources is well known in the art. Antimony usually occurs in its ores as either a sulfide or as an oxide mineral, sometimes in combination with other minerals. For example, the most common sulfide mineral of antimony is stibnite, $Sb_2S_3$. However, there is a pentasulfide mineral $Sb_2S_5$ and a tetrahedrite mineral of both copper and antimony sulfide, ($3Cu_2S \cdot Sb_2S_3$). A common form of the oxide mineral is valentinite, $Sb_2O_3$.

As is well-known to the art, most sulfide minerals respond readily to concentration by froth flotation. Because of this, antimony ores containing antimony as a sulfide mineral have been the most practical source of antimony. On the other hand, it is rarely practical to attempt concentration of oxide minerals by froth flotation. For this reason, the oxide minerals of antimony, when they do occur with the sulfide minerals, have often been wasted. Thus, many potential antimony ores are considered uneconomic because their antimony content is in the form of an oxide mineral or their total antimony content is unattractive because it is divided between oxide minerals and sulfide minerals. In the United States, antimony has long been considered as a by-product of industries producing silver or copper as primary products. Only the highest grade antimony ores have been directly processed for antimony as a primary product.

There are presently two practical processes for the recovery of antimony metal. In one process the copper-antimony mineral tetrahedrite, concentrated by froth flotation, is leached in hot concentrated sodium sulfide to dissolve the antimony and the clarified solution from the leaching is electrolyzed to produce electrolytic antimony. In this process, spent anolyte from the electrolysis step is discarded to the extent necessary to control impurities in the circuit.

A second process fuses the tetrahedrite mineral with sodium carbonate, coal and sodium sulfate in an electric furnace to form a matte which is then crushed and water latched to solubilize a sodium-sulfur compound of antimony, the antiony subsequently recovered by electrolysis.

A completely pyrometallurgical process for antimony recovery involves a specially designed blast furnace for processing a mixture of antimony oxide and antimony sulfide ores to form an antimony "pig." This is then further refined in reverberatory furnaces to yield antimony metal and an impure antimony oxide dust, collected in a baghouse.

All of these prior art antimony recovery processes are cumbersome, relatively costly, and have inherent air pollution potential. Furthermore, their practicability resides in processing relatively high grade antimony feed materials.

BRIEF DESCRIPTION OF THE INVENTION

There is presented herewith a relatively uncomplicated process which will treat antimony sulfide ores, antimony oxide ores, or mixtures of minerals containing antimony oxides an antimony sulfides without involving leaching in the presence of sulfur compounds, pyrometallurgical fusions or complicated electrolysis processes.

In essence, our process consists of crushing and grinding antimony-containing material and processing this directly without the need for froth flotation or other upgrading procedure.

The sized material is mixed with a reducing agent, heated under controlled conditions of time and temperature and leached with a water solution of an alkaline substance at elevated or ambient temperature and pressure. The antimony is then precipitated from the solution as an antimony compound by pH adjustment recovered by filtration or other suitable means, and the clarified leach solution is regenerated and recycled to the process.

One important aspect of the inventive process is its versatility. For example, if the antimony feed material is essentially of a sulfide form, the time and temperature of the roasting step is selected such that the sulfur present might be converted to sulfates. However, if the antimony feed material is primarily an oxide form of antimony, both the time and temperature of the roasting operation may be changed to accommodate this type of feed. Antimony feed materials containing relatively important quantities of both antimony oxides and antimony sulfides may be used by selection of proper roast conditions.

Furthermore, the quantity of the reducing agent may be varied to accommodate the type of feed material, it being essential that the valence state of the total antimony values in the roast material being converted to a form susceptible to recovery through alkaline leaching.

Another important feature of the process is the acidification of an antimony-pregnant carbonate leach solution with carbon dioxide gas.

The antimony in the solution is apparently in the form of a water-soluble antimony-hydroxyl-carbonate which, upon destruction of its hydroxyl component using an acid, or acid precursor, precipitates as an antimony compound. The removal of antimony and the hydroxyl ions from the system by introducing an acid leaves the alakli free to combine with the acidic constituents of the now antimony-deleted leach solution. If carbon dioxide is used as the acid former or precurosr, the potassium carbonate originally used to leach the roast product is thus regenerated and can be recycled to the leaching step. If it is desired to produce sulfate, nitrate or sulfite salts, then the corresponding acid anions could be used as the acid forming material.

DETAILED DESCRIPTION OF THE INVENTION

The process of this invention may be conveniently divided into the following separate processing steps:
1. Preparation of the Feed Material
2. The Roasting Step
3. The Leaching Step
4. The Acidification Step
5. Drying and Recovery of Product These separate steps will be now more specifically described.

1. Preparation of Feed Material

As was generally stated above, the feed material for the process of this invention may be any mineral value containing antimony whether in the oxide form, the sulfide form, or mixtures thereof.

For ease in subsequent processing steps, the feed material is preferably comminuted or ground to a particle size so that it will all pass through a 28 mesh Standard Tyler Screen.

2. The Roasting Step

The antimony containing feed material ground to the desired particle size is then admixed with a substance which will ensure that the roasting step is performed in a reducing environment. This is accomplished by admixing with the ground feed material a reducing agent which may be a carbon containing material in either solid or gaseous form. Gaseous carbon containing materials which are operable include methane, carbon monoxide, natural gas and the like. It is preferred, however, to admix with the ground feed material, a solid carbonaceous material such as coal, charcoal, coke, hydrocarbon residue and the like. These materials are also ground to a fine particle size to ensure uniform admixing.

The amount of the reducing agent which is admixed with the mineral feed will depend upon the nature of the starting material. Preferably from 0.2 to about 10.0 parts of the reducing agent for pound of antimony present in the mineral feed is used. Especially preferred is a ratio of 0.5 to 5.0 parts of reducing agent to antimony present.

The mixture of reducing agent and mineral feed material is then subjected to the roasting step at carefully controlled conditions of time and temperature. The roasting vessel or furnace may be a standard rotary kiln, a hearth type roaster, or the like. Any stationary vessel that is equipped with a device for "rabbling" the material during the roasting step may be used.

The material is heated to a centigrade temperature of between about 300°C – 1,500°C, preferably 800°C – 1,000°C, for a period of time of between about 10 to about 120 minutes, preferably from about 30 to about 90 minutes.

The roasting step is carried out until the antimony values present are all converted to an alkaline soluble form. It is to be understood that analytical techniques and existing materials may be used to insure that the roasting operation is continued to the completion of this conversion.

3. The Leaching Step

The calcine resulting from the roasting step is then contacted with an alkaline solution in the leaching step. If the roasting process has resulted in the formation of larger particles, it has been found advantageous to grind the calcine to a particle size so that the material all pass through a 15 – 30 Mesh Standard Type Screen before contact with the alkaline solution in the leaching zone.

The leaching solution which dissolves the antimony values from the calcine containing the same, is preferably a water solution of an alkaline material, such as potassium carbonate or sodium carbonate. However, other alkaline solutions may be used, such as potassium hydroxide, calcium hydroxide, sodium hydroxide or mixtures thereof.

Especially preferred, and used in the preferred embodiment of this invention, are alkaline carbonate solutions containing from about 30 to about 500 grams of potassium carbonate, sodium carbonate or mixtures thereof, per liter of solution.

The ground calcine and the leaching solution are contacted in a mixing zone until all the antimony values have been leached from the calcine to form a leached residue and an antimony-pregnant alkaline carbonate solution.

4. Acidification Step

The antimony-pregnant alkaline carbonate solution is passed to an acidulation vessel and its hydrogen ion concentration adjusted to a pH of from about 4 to about 12, preferably from about 5 to about 9. This is accomplished by admixing with the solution an acid-former which may be an acid per se, preferably a mineral acid or mixtures of mineral acids, or may be a gaseous material such as carbon dioxide, sulfur dioxide, sulfur trioxide or the like. The use of carbon dioxide as the acid former is especially advantageous since its use regenerates the alkaline carbonate solution which may then be filtered and recycled to the leaching step.

5. Drying and Recovery of Product

The acidification of the antimony-pregnant solution results in the precipitation of an antimony compound. It is believed that the antimony in the calcine is solubilized to an antimony-hydroxyl-carbonate and is hydrated by the acid or acid-former to a hydrated antimony compound and precipitates from the solution. The precipitate is then filtered from the antimony depleted solution and is carefully dried to result in the final product.

The antimony-depleted leach solution is then either recycled to the leaching zone or further processed to recover desirable alkaline values therefrom.

The invention will be more clearly explained by reference to the following illustrative examples.

EXAMPLE I

An antimony ore containing a mixture of both antimony oxide minerals and antimony sulfide minerals and containing a total of 3.3% antimony was crushed and ground to pass through a 65 Mesh Standard Tyler sieve. A 50 g. portion of the material (containing 1.65 g. of antimony) was then thoroughly mixed with 2½ g. of metallurgical grade coke (also crushed and ground approximately the same screen size as was the antimony ore). The mix was then heated to a temperature of 800°C and held at this temperature with frequent rabbling for 30 minutes.

The calcine resulting from this roasting step was then placed in a solution consisting of 300 ml of water and 60 g. of potassium carbonate ($K_2CO_3$) and the system stirred at ambient temperature of 30 minutes. Following this leaching step, the system was filtered and the undissolved solids (residue) discarded.

The filtrate containing the dissolved antimony, having increased in volume to 320 ml as the result of combining the washings of the last of the antimony from the insoluble residue, was analyzed and found to contain 1.52 g. of dissolved antimony. This figure indicates a solubilization of 92% of the antimony originally in the 50 g. ore sample.

The antimony-pregnant solution was then acidified with sulfuric acid to change the pH of the solution to pH 7.0. At this solution pH, all of the antimony originally solubilized was precipitated.

The product, after drying at 100°C. to remove mechanical water, was found to analyze 90.4% antimony oxide.

EXAMPLE II

An antimony ore containing a mixture of both antimony sulfide minerals and antimony oxide minerals and containing a total of 3.3% antimony was crushed to pass a 65 Mesh Standard Tyler sieve. A 50.0 g. portion of this material (containing 1.65 g. antimony) was mixed with 2.5 g. of metallurgical coke, (ground to the same size as the antimony ore) and roasted for a period of 90 minutes at 800°C.

The resulting calcine was leached in 300 cc of a solution containing 60 g. of potassium carbonate ($K_2CO_3$) with agitation at ambient temperature for 20 minutes and filtered to produce a residue, which was washed to remove entrained soluble antimony, and a filtrate containing dissolved antimony values. The filtrate volume was 320 cc, including 20 cc of wash water used for washing the leached residue.

An analysis of this solution indicated the presence of 1.55 g. of antimony. This figure calculates to a solubilization of 941% of the antimony originally in the 50.0 g. ore sample.

The antimony-pregnant filtrate was acidified with $CO_2$ gas until the solution pH was 8.2. During this step an antimony compound was precipitated from solution. The antimony compound was removed by filtration and dried at 100°C. The product had a purity of 92% as antimony trioxide.

Acidulation to neutral pH of the antimony-pregnant leach solution caused the precipitation of the antimony content of the solution as antimony compound but also served to regenerate the potassium carbonate content of the leach solution. After regeneration the carbonate value was measured and found to be the equivalent of 200 grams of $K_2CO_3$ per liter of solution.

This regenerated solution was then clarified by filtration and recycled to the leaching step.

EXAMPLE III

In this experiment sodium carbonate was used as the leaching reagent.

An antimony ore containing a mixture of both antimony sulfide minerals and antimony oxide minerals and containing a total of 3.3% antimony was crushed to pass a 65 Mesh Standard Tyler sieve. A 50.0 g. portion of this material was mixed with 2.5 g. of metallurgical coke (ground to the same size as the antimony ore) and roasted for a period of 30 minutes at 800°C.

The resulting calcine was leached in 300 cc of a solution containing 60 g. of sodium carbonate ($Na_2CO_3$) and agitated at ambient temperature for 30 minutes.

The pulp was filtered to produce a residue which was washed to remove entrained soluble antimony and a filtrate containing dissolved antimony values. The filtrate volume was 320 cc and contained, in total, 1.09 g. of antimony. This figure indicates a recovery of 66% of the antimony persent in the initial 50 g. sample.

The antimony-pregnant filtrate was acidified to pH of 8.2 with $CO_2$ gas. The precipitated antimony product was filtered and dried at 100°C. The product purity was found to be 88% as antimony trioxide. The sodium carbonate values has been regenerated for recycle to the leaching step.

The invention will be further explained by reference to the attached drawings in which:

FIG. 2 is one form of an apparatus which may be used in practicing the inventive process.

Figure 1:
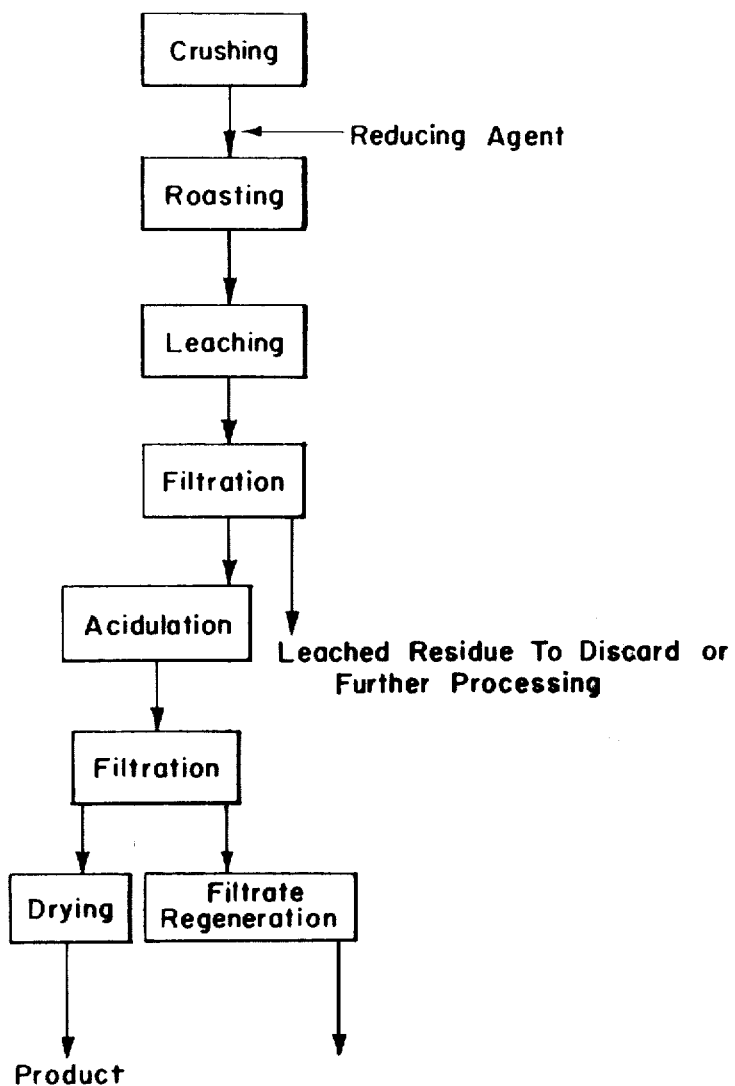
FIG. 1 represents a block schematic diagram showing the process flow.

Turning now to the drawing and particularly with reference to FIG. 2, the antimony containing material is deposited from hopper 10 through valved line 12 to endless belt conveyor 14 which is activated by driving pulley 16 around idler pulley 18.

The desired quantity of the reducing agent is similarly deposited on belt conveyor 14 from storage hopper 20 through valved line 22.

Thus the mixture is dropped from belt conveyor 14 into crusher or grinder 24 and is comminuted to the desired particle size as a mixture.

Of course, it is to be understood that the antimony containing feed material and the desired reducing agent may be separately ground and thereafter blended together in the desired ratio.

From crusher 24 the mixture of antimony containing material and reducing agent is passed through line 26 and into roasting vessel 28.

Here the mixture is adjusted to carefully controlled condition of temperature and time until substantially all of the antimony values present in the feed is in the alkaline soluble form.

Upon completion of the roasting step the calcine is passed through line 30 into a second grinder 32 where the calcine is broken up and crushed to the desired particle size.

Although roaster 28 is depicted in FIG. 2 as a rotary kiln type vessel it is to be understood that other roasting means may be used. For example, the usual hearth type roasting vessel is operable if equipped with "rabbling" means in order to expose fresh surface to the roasting step.

From crusher 32 the ground calcine is passed through line 34 to leaching vessel 36 which is equipped with mixing means such as agitator 38 driven by motor 40.

Through line 42 the desired amount of an alkaline leaching solution preferably a potassium carbonate solution containing from about 30 to about 500 grams of potassium carbonate per liter of solution, is introduced into the leaching vessel.

The mixture is agitated for the desired period of time, that is to say until the antimony values are all dissolved.

The resulting slurry of antimony pregnant leaching solution and the particulate leached residue is pumped by means of slurry pump 44 and lines 46 and 48 to filtration means 50. Here the leached residue is separated from the solution and discarded through line 52.

The clarified solution, the antimony-pregnant leach solution, is passed through line 54 into acidulation tank 56. This tank is equipped with agitating means such as agitator 58 driven by motor 60.

There is added through line 62 the desired amount of an acidulation substance, such as an acid or an acid former, and the contents of the tank 56 throughly admixed.

During the acidification step, in which the pH of the solution is adjusted toward the neutral value, the antimony values in the antimony-pregnant leach solution is precipitated in the form of an antimony compound.

The solution of precipitated antimony compound and the antimony depleted leach solution is passed to filtration means 64 through line 66. Here the precipitated compound is separated from the solution. It is then passed through line 68 to drier 70, where residual water is removed and from which it is withdrawn through line 72 from the process.

The antimony depleted leach solution is withdrawn from filter 64 through line 74 to vessel 76 where it may be further processed for the recovery of alkaline values or may be recycled through line 78 to leaching vessel 36.

As was explained above, direct recycling of the antimony depleted leach solution may be used when the acid former used in the acidulation vessel 56 is selected so as to regenerate the alkaline leach solution. For example, when the leaching solution is potassium carbonate and when the acid former used is carbon dioxide gas, regeneration of potassium carbonate occurs and the regenerated solution may be recycled to the leaching vessel. Other means of regeneration of the depleted leach solution may of course be used in vessel 76.

The foregoing descriptions indicate the novelty of this discovery, and are not to be considered limiting. For example, leaching solutions containing a mixture of sodium carbonate and potassium carbonate may be used. Those skilled in the art will appreciate that the choice of the alkali carbonate resides in the economics of leaching reagent cost and leaching reagent regeneration for recycle. Also, as already pointed out, the choice of acid-former for precipitating the antimony compound will be determined by economics and might range from the calcination of limestone to generate carbon dioxid gas for the acidification step to the use of a waste acid such as hydrochloric or sulfuric which might be brought into the flow sheet in the interest of abating water pollution from the waste acid.

It will also be appreciated that the alkali leach solution containing solubilized antimony could be relieved of its antimony content by other procedures such as crystallization and/or electrolysis. In view of the increasing demand for antimony oxide and other antimony salts as compared with that of antimony metal, this process is especially useful since it produces an antimony compound directly without first producing antimony metal which must then be burned to the oxide.

To summarize briefly this invention relates to the processing of ones of antimony without regard to the mineral composition thereof. The process includes controllably roasting said ores, or antimony concentrates, in the presence of a reducing agent to convert all of the antimony present to an alkaline soluble form; leaching the roasted material in an alkaline solution, such as a solution of potassium carbonate, clarification of this antimony-pregnant leach solution, adjusting the pH of the clarified antimony-pregnant solution sufficiently toward the neutral or acid side to assure that the antimony present is precipitated as a recoverable antimony compound. The now antimony-depleted leach solution may be recycled or put to further uses depending upon the acid-former, used in the acidulation step. Preferably, this acid-former is carbon dioxide which serves to regenerate a carbonate leaching solution which is then recycled to the leaching step.

What is claimed is:

1. A process for the recovery of antimony values from ore containing the same which comprises the steps of:
    roasting the antimony-containing material in the presence of a reducing agent under controlled conditions of time and temperature to produce a calcine;
    leaching said calcine in an alkaline solution to produce a mixture of an antimony-pregnant aqueous solution and a solid residue;
    filtering said mixture;
    discarding said solid residue from the process;
    adjusting the hydrogen ion concentration of said filtered antimony-pregnant solution with an acid-former to cause the antimony values in said pregnant solution to precipitate as an antimony concentrate;
    separating said precipitated antimony concentrate and;
    drying said antimony concentrate to yield a high purity antimony salt.

2. A process according to claim 1 in which the antimony containing material is an antimony ore in which the antimony occurs substantially as an antimony oxide mineral.

3. A process according to claim 1 in which the antimony containing material is an antimony ore in which the antimony occurs substantially as an antimony sulfide mineral.

4. A process according to claim 1 in which the antimony containing material is a mixture of antimony oxide minerals and antimony sulfide minerals.

5. A process according to claim 1 in which the antimony containing material is an antimony concentrate produced from an ore containing antimony.

6. A process according to claim 1 in which the alkaline solution is potassium carbonate.

7. A process according to claim 1 in which the aqueous alkaline solution is sodium carbonate.

8. A process according to claim 1 in which the aqueous alkaline solution is a mixture of sodium carbonate and potassium carbonate.

9. A process according to claim 1 in which the aqueous alkaline solution used is selected from the class consisting of solutions of sodium hydroxide, calcium hydroxide, potassium hydroxide, sodium carbonate, potassium carbonate or mixtures thereof.

10. The process of claim 1 in which the reducing agent is coal or coke produced from coal.

11. The process of claim 1 in which the reducing agent is coke derived from petroleum.

12. The process of claim 1 in which the reducing agent is charcoal.

13. The process of claim 1 in which the reducing agent is a gaseous hydrocarbon selected from the class consisting of methane, carbon monoxide, and natural gas.

14. The process of claim 1 in which the acid-former is carbon dioxide gas.

15. The process of claim 1 in which the acid-former used is sulfur dioxide gas.

16. The process of claim 1 in which the acid-former used is sulfuric acid.

17. The process of claim 1 in which the acid-former used is nitric acid.

18. The process of claim 1 in which the acid-former used is hydrochloric acid.

19. The process of claim 1 in which the acid-former used is sulfur trioxide.

20. The process of claim 1 in which the acid-former used is a mixture of acid-forming gases.

21. The process of claim 1 in which the acid-former used is a mixture of mineral acids.

22. The process of claim 1 in which the antimony-containing material is ground to a particle size such that it passes through 28 Mesh Standard Tyler Screen.

23. The process of claim 1 in which the reducing agent is sized to pass a 28 Mesh Standard Tyler Screen.

24. The process of claim 1 in which the ratio of reducing agent to antimony in the mixture roasted is between 0.2 lbs. and 10.0 lbs. of reducing agent for each pound of antimony.

25. The process of claim 1 in which the roasting temperature is controlled to one between about 300° and 1,000°C.

26. The process of claim 1 in which the calcine leaching time is between about 10 minutes and about 120 minutes.

27. The process of claim 1 in which the hydrogen ion concentration of the antimony-pregnant leach solution is adjusted to a pH value of between 4.0 and 12.0.

28. A process for the production of a high purity antimony compound which comprises the steps of:
grinding an antimony containing material and a carbon containing material;
mixing said ground materials in a ratio of carbon to antimony between 0.2 and 10.0;
heating said mix to a temperature of between 300° and 1,000°C for a period of 10 minutes to 120 minutes;
agitating the calcine so formed in an aqueous carbonate solution for a time period of 10 minutes to 120 minutes to result in an antimony-pregnant solution and an insoluble residue;
separating said antimony-pregnant solution from said insoluble residue;
treating said antimony-pregnant solution with carbon dioxide gas to precipitate an antimony compound and to regenerate aqueous carbonate;
separating the regenerated carbonate solution from the precipitated antimony compound;
recycling said solution to the leaching step; and
drying the antimony precipitate to result in a high purity antimony compound.

29. The process of claim 28 in which the heat treatment is carried out in a direct fired roaster.

30. The process of claim 28 in which the heat treatment step is carried out in an indirectly heated roaster in which the products of combustion do not contact the roaster charge.

31. The process of claim 28 in which the heat treatment step is carried out in a batch-type furnace in such a manner that the furnace charge can be rabbled during the roasting operation.

32. The process of claim 28 in which the carbonate content of the leaching solution is maintained between 30 g. and 500 g. of potassium carbonate per liter of leach solution.

33. The process of claim 28 in which the hydrogen ion content of the antimony-pregnant solution is adjusted by introduction of carbon dioxide gas to a pH range of between pH 4.0 and pH 9.0.

34. The process of claim 33 in which the pH is adjusted to approximately pH 7.0 with a mineral acid.

35. The process of claim 28 in which the calcine is comminuted to substantially a 20 Mesh Standard Tyler Screen size prior to the leaching step.

36. A process for the production of an alakli carbonate solution containing dissolved antimony therein, which comprises the steps of:
heat treating a mixture of an antimony-containing material and a carbon-containing material, said heat treatment being in the range of 800° to 1,000°C;
agitating said heat treated mixture in an aqueous solution of an alkali carbonate to result in an antimony-pregnant alkali carbonate solution and an insoluble residue;
separating said residue from said solution; and
further processing said solution for its antimony values.

37. The process of claim 36 in which the alkali carbonate solution is an aqueous solution of potassium carbonate.

38. The process of claim 36 in which the antimony dissolving step is carried out at ambient temperatures and pressures.

39. The process of claim 36 in which the antimony dissolving step is carried out at elevated temperatures and pressures.

40. The process of claim 36 in which the alkali carbonate solution is a solution of sodium carbonate.

* * * * *